United States Patent [19]

Nutzmann

[11] Patent Number: 5,275,471
[45] Date of Patent: Jan. 4, 1994

[54] COMPOSITE VEHICULAR WHEEL

[75] Inventor: Wolfgang Nutzmann, Solingen, Fed. Rep. of Germany

[73] Assignee: Mannessmann Aktiengesellschaft, Dusseldorf, Fed. Rep. of Germany

[21] Appl. No.: 912,816

[22] Filed: Jul. 13, 1992

[30] Foreign Application Priority Data

Jul. 12, 1991 [DE] Fed. Rep. of Germany ....... 4123583

[51] Int. Cl.$^5$ ............................................. B60B 23/06
[52] U.S. Cl. .................................. 301/10.1; 301/11.1
[58] Field of Search ...................... 301/9.1, 10.1, 11.1, 301/12.1, 12.2, 35.51, 35.62, 95–99, 63.1, 64.1, 9.2, 301/11.2

[56] References Cited

U.S. PATENT DOCUMENTS

| | | | |
|---|---|---|---|
| 2,135,481 | 11/1938 | Brink | 301/12.1 X |
| 3,186,767 | 6/1965 | Walther | 301/9.2 X |
| 4,124,051 | 11/1978 | Horton | 301/11.2 |
| 4,361,358 | 11/1982 | Bonniwell et al. | 301/63.1 X |
| 4,982,998 | 1/1991 | Mikawa | 301/11.1 |
| 5,067,776 | 11/1991 | Aderer | 301/9.2 |

FOREIGN PATENT DOCUMENTS

| | | | |
|---|---|---|---|
| 3316738 | 11/1984 | Fed. Rep. of Germany | 301/11.1 |
| 3904009 | 8/1990 | Fed. Rep. of Germany | 301/10.1 |

*Primary Examiner*—Russell D. Stormer
*Attorney, Agent, or Firm*—Schweitzer Cornman & Gross

[57] ABSTRACT

A composite vehicular wheel having inner and outer sides, having a hub with a peripheral circumference, and a wheel rim having a tire attachment surface, and a recessed base with inner and outer ends and having a flange at its outer end at a substantially right angle to the base, the wheel rim being releasably attached along respective contact surfaces to the hub, and means on the outer side of the flange for attaching the wheel rim to the hub, the peripheral circumference of the hub conformingly matingly adjoins an axially disposed transitional surface on the inner side of the recessed base of the wheel rim, the transitional surface having a flat hump and extends from the inner side of the flange of the recessed base to an edge of the tire attachment surface.

4 Claims, 3 Drawing Sheets

COMPOSITE VEHICULAR WHEEL

FIELD OF THE INVENTION

The present invention relates to a composite vehicular wheel having a wheel rim with a recessed base, and a hub connected thereto.

BACKGROUND OF THE INVENTION

Composite wheels are increasingly employed because of their weight and other advantageous shape conditions, wherein wheel rim and hub are separately produced by possibly different manufacturing methods, and then are connected to each other. A composite two-part wheel of this type is shown, for example, in FIG. 2 of British patent No. 1,316,954. This kind of composite wheel has a wheel rim with a recessed base as one part, and a hub as another part, and these are connected to each other by bolts welded to the outer side of the a flange on the recessed base. After the initial mounting of hub and wheel rim the bolt is passed through an opening in the outer edge of the hub and is then welded to the wheel rim. Finally the head is formed on the free end of the bolt and thus a tight connection is formed which cannot be loosened. The advantage of this structure is that the radial forces and a large part of the axial forces act on the connecting means and thus its load bearing ability is limited.

German published patent application 4,019,649 shows a similar construction of a composite wheel. This wheel has a wheel rim with a recessed base. The wheel rim in the area of the base has a radially inwardly extending flange with holes for bolts distributed throughout its circumference. The single part hub has in its outer peripheral circumference an area which mates the flange of the wheel rim, and also has bolt holes distributed over its circumference. Bolts are placed in the holes of the wheel rim and the hub, with nuts on them for a strong connection between the two parts. It is a disadvantage of this vehicular wheel that, it has a structural limitation in that the flange of the wheel rim can be produced only by casting or through complex forging operations with subsequent mechanical processing. A further disadvantage is that the wheel rim is a cast body which must be produced with thick walls for transferring the required forces, instead of a wheel rim produced by rolling or pressing. This is a unfavorable factor due to its large weight.

German utility model 9,014,530 shows a similarly constructed composite wheel. The wheel rim which has a well base is provided in the area of the well base with a ring shaped thickening of the material on the inner or outer surface of the wheel. A number of circumferential threaded bores are arranged around the circumference of this thickened portion, parallel to the axis of the wheel. The disk shaped hub has openings in the area of its outer circumference, which correspond to the threaded bores. These openings serve for passing the bolts through them so that a strong connection can be established between the wheel rim and the hub. This composite wheel can also not be considered to be optimal from the point of view of weight, since the required amount of material in the recessed base area of the wheel rim can be only obtained by casting and a complex forging procedure.

A composite vehicular wheel with a single part wheel rim and a hub attached to it by bolts, is shown in German published patent application 3,915,595. Similarly to the disclosure of the aforementioned German published patent application 4,019,694, the wheel rim has a radially inward flange on the inner side and this is bolted to the hub. The disadvantage of this structure is that the flange can be formed only by casting and complex forging thereafter. The alternative suggestion of welding such a flange on the wheel rim is also disadvantageous since the total forces pass through the weld and therefore subjects it to high loadings.

DESCRIPTION OF THE INVENTION

It is an object of the invention to provide to improved composite vehicular wheel which has lower weight, greater availability of the structural variations and can be loaded to a greater extent.

The present invention relates to a composite vehicular wheel having inner and outer sides, comprising (i) a hub having a peripheral circumference, and (ii) a wheel rim having a tire attachment surface, and a recessed base with inner and outer ends and having a vertical portion at its outer end at a substantially right angle to the base, the wheel rim being releasably attached along respective contact surfaces to the hub, and means on the outer side of the vertical portion for attaching the wheel rim to the hub, the peripheral circumference of the hub matingly adjoins an axially disposed transitional surface on the inner side of the recessed base of the wheel rim, and the transitional surface having a flat hump and extends from the inner side of the vertical portion of the recessed base to an edge of the tire attachment surface. The vertical portion of the recessed base on the outer side of the vehicular wheel suitably has indentations distributed thereon, with inner and outer sides disposed at approximately right angles to the recessed base.

In contrast with the known prior art the single part wheel rim is prepared from a metal strip whereby the material can be the customary carbon steel, stainless steel, or a light metal alloy. The forming of a vertical part is not required on the rim since the contact surface is the recessed wheel well on the outer side of the wheel. Threaded connecting means which are known per se, such as welded or swaged bolts are attached to the recessed wheel well. Alternatively, also a nut can be welded to it.

To avoid exerting the radial forces through the bolt onto the hub, the outer periphery of the hub contacts and matingly adjoins a transitional intermediate surface which extends on the inside of the recessed base from recessed base until the rim of the tire attachment surface. This can be achieved in such a manner that the hub has a larger diameter than the inside diameter of the intermediate surface on the wheel rim, and then is swapped by pressing into the wheel rim. It is particularly advantageous for the desired contact between the surfaces when the wheel rim in the range of the transitional surface has so-called "flat hump" which is known per se. In this case the contour of the transitional surface of the hub is mated to the like contour of the flat hump. The axial extension of the hub in the transitional area is selected so that the contact surface of the hub includes at least the area of the flat hump. However, it can also extend beyond this out until the tire attachment surface.

An advantage of the vehicular wheel of the present invention is to be found in that the design of the vehicular wheel permits larger number of design configurations and enables an extremely simple construction of the wheel.

DESCRIPTION OF THE DRAWING

The present invention is described in greater detail with reference being had to the drawing, wherein.

DETAILED DESCRIPTION OF THE DRAWING

Figure 1:
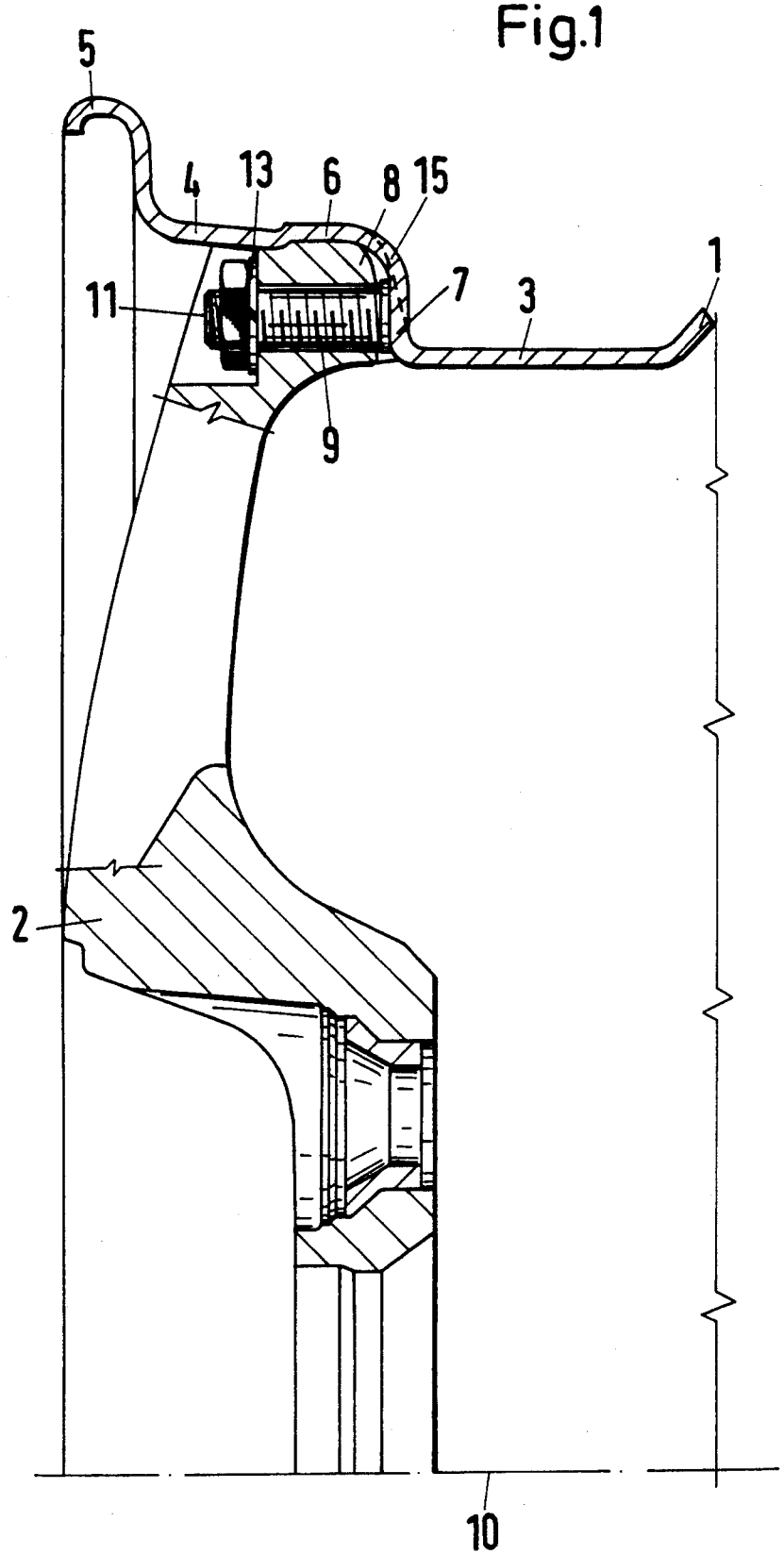
FIG. 1 is a partial cross-sectional view of a radial cross section of a vehicular wheel in accordance with the present invention, containing a welded bolt.
Figure 3:
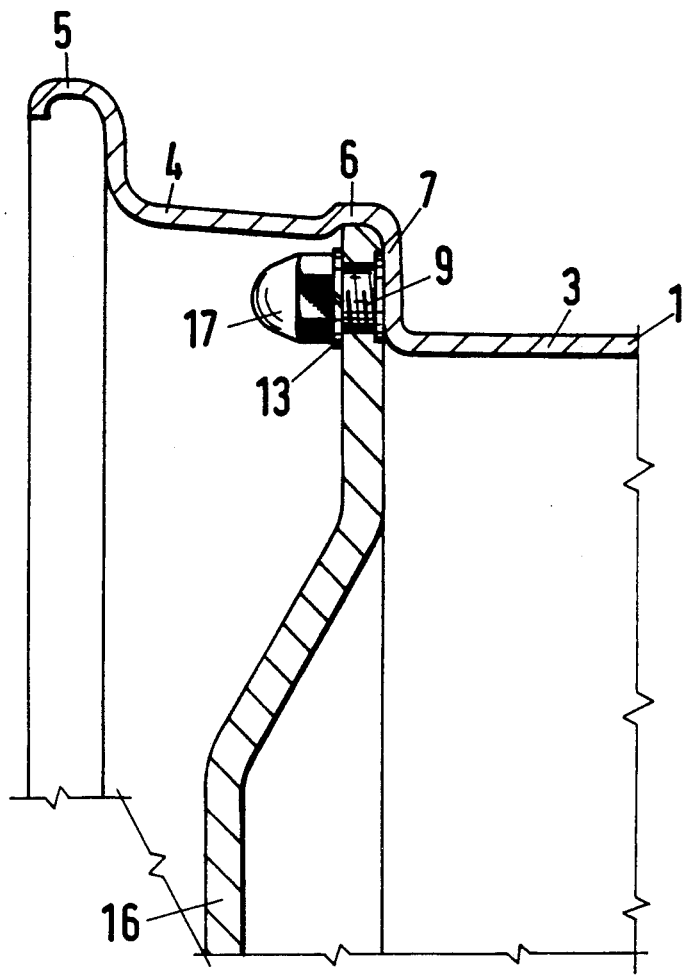
FIG. 3 is yet another embodiment that is similar to FIG. 1 but it has a hub formed from a metal strip.

As shown particularly in FIG. 1, the two-part vehicular wheel of the present invention has a wheel rim 1 which is a single piece prepared from a metal strip, and a hub 2 which can be suitably a single cast piece, or also made from a metal strip as shown for example in FIG. 3. The wheel rim 1 has a recessed base 3, a tire attachment surface 4, and a flange 5. In the embodiment shown in FIG. 1, a flat hump 6 is formed in the transition between the recessed base 3 until the rim of the tire attachment surface 4. The vertical portion 7 of the recessed base has recessed portions 15 distributed on the outer surface radially around its periphery, at practically right angles to the recessed base 3. The area 8 of the hub which lies in the outer peripheral area, follows the contour of the flat hump 6 and is in conforming mating contact therewith. The connecting means, such as the bolt 9 of FIG. 1 is welded to the exterior side of the recesses or indentations 15 in the vertical portion 7 of the recessed base so that the axis of the bolt approximately parallels the axis 10 of the wheel. The welded bolt 9 which has a thread on it extends through the wall of the outer periphery of the hub and is distributed around the periphery of the wheel rim 1. A nut 11 can be screwed onto the thread of the bolt 9 and suitably pressed against a lockwasher 13. After all nuts are tightened, a force resistant, stiff connection is established between the wheel rim 1 and the hub 2.

Figure 2:
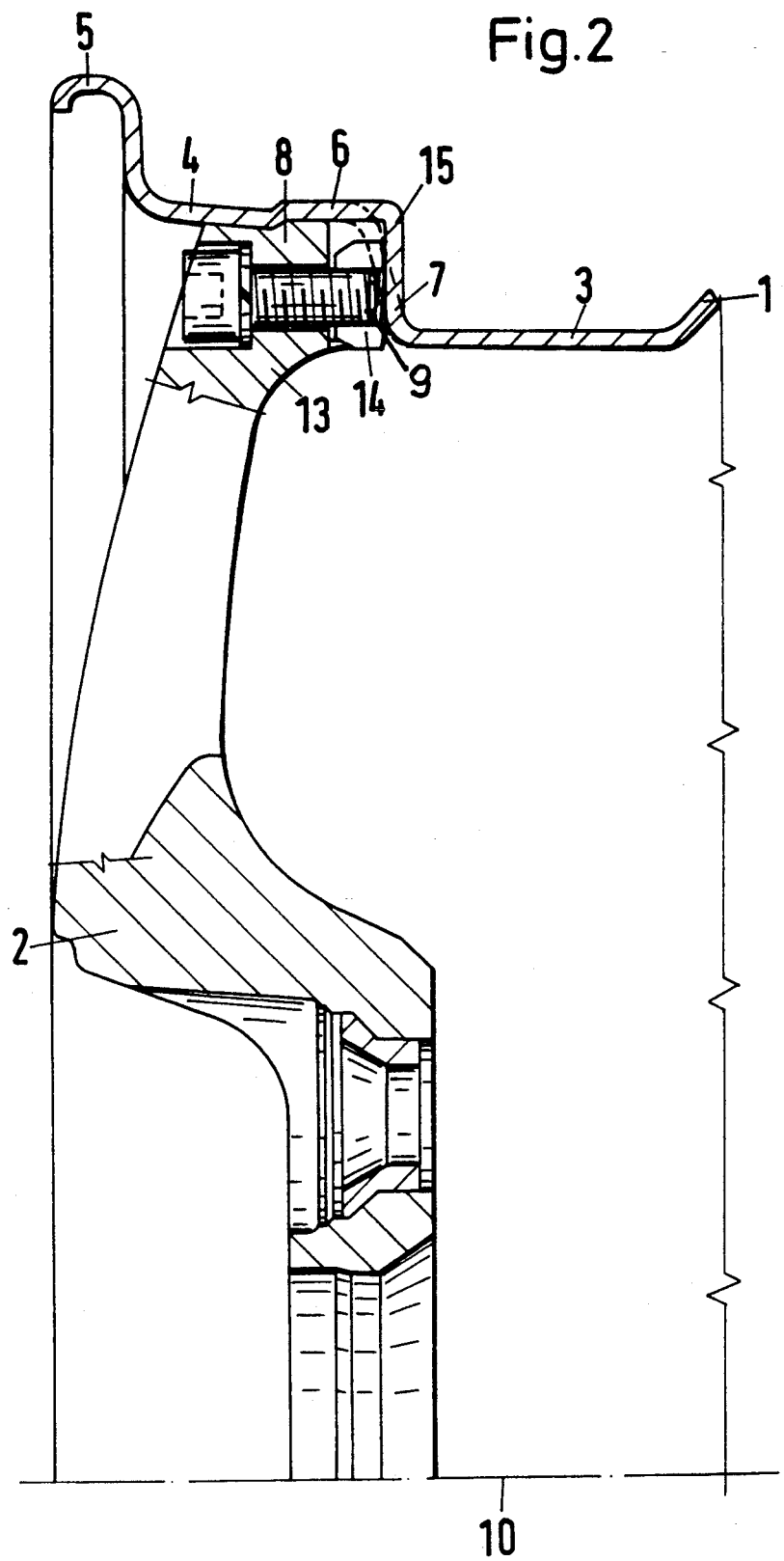
FIG. 2 is another embodiment that is similar to FIG. 1, but it employs a nut for the connection of the bolt to the wheel.

Another embodiment of the composite wheel of the present invention is shown in FIG. 2 in which a nut 14 is employed as the means for connecting the two parts. For purposes of simplification the same parts of the embodiments in FIGS. 1 and 2 are designated with the same reference numerals. Also in this embodiment the transitional surface of the wheel rim 1 between the recessed base 3 and the rim of the tire attachment surface 4, is formed with a flat hump 6. The outer periphery of the hub matingly adjoins these surface contours and extends, as in FIG. 1, along the flat hump 6 into the tire attachment surface 4. An hexagonal Allen-head bolt 9 is employed in this embodiment for providing a firm connection between the two parts. This bolt can be screwed into the nut 14 and is also pressed against a lockwasher which in both of these embodiments of FIGS. 1 and 2 maintains the tight screw connection.

In the embodiment of the present invention shown in FIG. 3 the hub 16 is a stamping from metal strip. A welded bolt 9 provides the means for connecting the two parts. The bolt extends through openings distributed around the hub 16. In contrast with the embodiment shown in FIG. 1, here a cap nut 17 is used which is also screwed on against a lockwasher. In contrast with the embodiments of the invention shown in FIGS. 1 and 2, in the embodiment of FIG. 3 the flat hump 16 extends to a lesser extent in the axial direction since the vertical portion 7 of the recessed space which is on the exterior side of the wheel, runs almost at right angles to the recessed hub 3. Suitably one can also employ recesses in the embodiment of FIG. 3 as is shown in connection with the recesses 15 in the embodiments of FIGS. 1 and 2. Also in this embodiment it is assured that the radial forces do not act directly on the means for connecting the two parts of the composite wheel.

I claim:

1. A composite vehicular wheel having radially inner and outer sides, and axially inner and outer sides, comprising:
   (i) a hub having a peripheral circumference with a peripherally outer diameter and a peripherally outer surface, and
   (ii) a wheel rim having a tire attachment portion with an axially inner edge, peripherally inner and outer tire attachment surfaces, peripherally inner and outer diameters, a peripherally inner surface, a radially inner side, a recessed base with axially inner and outer ends, a substantially axially disposed transitional surface on the radially inner side of the wheel rim axially inward of said tire attachment portion, a vertical portion between said transitional surface and said recessed base and disposed at a substantially right angle to the recessed base, said vertical portion having an axially outer side, a flat hump in said transitional surface and extending from the vertical portion of the recessed base to said axially inner edge of the tire attachment portion, peripheral indentations having axially outer sides and being distributed on the axially outer side of said vertical portion, and screw means affixed to the axially outer sides of said peripheral indentations for attaching the wheel rim to the hub, the wheel rim being releasably attached along common contact surfaces to the hub, the peripheral circumference of the hub conformingly matingly adjoins said transitional surface to form the common contact surfaces between the peripherally outer surface of the hub and the peripherally inner surface of the wheel rim, said common contact surface extending along said transitional surface along said flat hump along a part of the peripherally inner surface of the tire attachment portion, the peripherally outer diameter of said hub being larger than the peripherally inner diameter of the wheel rim where it matingly adjoins the peripherally outer diameter of the hub, and said larger peripherally outer diameter of said hub is snapped into its matingly adjoining position at the time of assembling the composite vehicular wheel.

2. The composite vehicular wheel of claim 1, wherein said means for attaching comprises a nut for attaching a bolt to the wheel rim.

3. The composite vehicular wheel of claim 1, wherein the wheel rim is a single piece formed from a metal strip.

4. The composite vehicular wheel of claim 3, wherein the hub is a single piece formed from a metal strip.

* * * * *